US012567078B2

(12) United States Patent
Cunningham et al.

(10) Patent No.: US 12,567,078 B2
(45) Date of Patent: Mar. 3, 2026

(54) CONTEXTUAL RECOMMENDATIONS BASED ON BEHAVIORAL ANALYTICS

(71) Applicant: Capital One Services, LLC, McLean, VA (US)

(72) Inventors: Sarah Jane Cunningham, Arlington, VA (US); Neha Pai, New York, NY (US); Caroline Williams, Purcellville, VA (US)

(73) Assignee: Capital One Services, LLC, McLean, VA (US)

(*) Notice: Subject to any disclaimer, the term of this patent is extended or adjusted under 35 U.S.C. 154(b) by 319 days.

(21) Appl. No.: 18/145,199

(22) Filed: Dec. 22, 2022

(65) Prior Publication Data

US 2024/0211971 A1     Jun. 27, 2024

(51) Int. Cl.
G06Q 30/0201     (2023.01)
G06Q 30/06     (2023.01)

(52) U.S. Cl.
CPC ......... G06Q 30/0201 (2013.01); G06Q 30/06 (2013.01)

(58) Field of Classification Search
CPC ............... G06Q 30/0201; G06Q 30/06; G06Q 10/00–50/00
USPC ............................................... 705/7.11–7.42
See application file for complete search history.

(56) References Cited

U.S. PATENT DOCUMENTS

| | | | | |
|---|---|---|---|---|
| 2013/0218721 A1* | 8/2013 | Borhan | .................. | G06Q 30/02 705/26.41 |
| 2014/0108210 A1* | 4/2014 | Chelst | ................. | G06Q 20/047 705/30 |
| 2014/0279539 A1* | 9/2014 | Rephlo | ............... | G06Q 20/405 705/44 |
| 2014/0310075 A1* | 10/2014 | Ricci | ...................... | G01C 21/26 705/13 |
| 2016/0042339 A1* | 2/2016 | Nichols | .................. | G06Q 20/12 705/35 |
| 2018/0005203 A1* | 1/2018 | Grassadonia | .......... | G06Q 20/40 |

(Continued)

OTHER PUBLICATIONS

Becker, Cherylynn et al., "The underlying dimensions of tipping behavior: An exploration, confirmation, and predictive model" International Journal of Hospitality Management, vol. 31, Issue 1, 2012, pp. 247-256, (https://www.sciencedirect.com/science/article/pii/S0278431911000776) (Year: 2012).*

*Primary Examiner* — Alan S Miller
(74) *Attorney, Agent, or Firm* — Harrity & Harrity, LLP

(57) ABSTRACT

In some implementations, a recommendation system may receive historical records. The recommendation system may determine a supplemental value added to a base value for each historical record associated with one or more service categories in which a total value customarily includes a base value and a supplemental value. The recommendation system may train one or more machine learning models to model behaviors related to the supplemental value customarily added to the base value when transactions are performed in the one or more service categories. The recommendation system may generate one or more recommendations related to the one or more service categories based on a current context including a location of a user device. The recommendation system may provide the one or more recommendations to the user device based on the current context of the user device.

20 Claims, 6 Drawing Sheets

(56)    References Cited

U.S. PATENT DOCUMENTS

| | | | |
|---|---|---|---|
| 2019/0188739 A1* | 6/2019 | Champaneria | G06Q 30/0202 |
| 2019/0220838 A1* | 7/2019 | Olenoski | G06Q 20/405 |
| 2020/0273005 A1* | 8/2020 | Abrons | G06Q 20/3278 |
| 2021/0365916 A1* | 11/2021 | Benkreira | G06Q 20/405 |
| 2023/0298076 A1* | 9/2023 | Zheutlin | G06Q 30/0283 |
| | | | 705/7.35 |

* cited by examiner

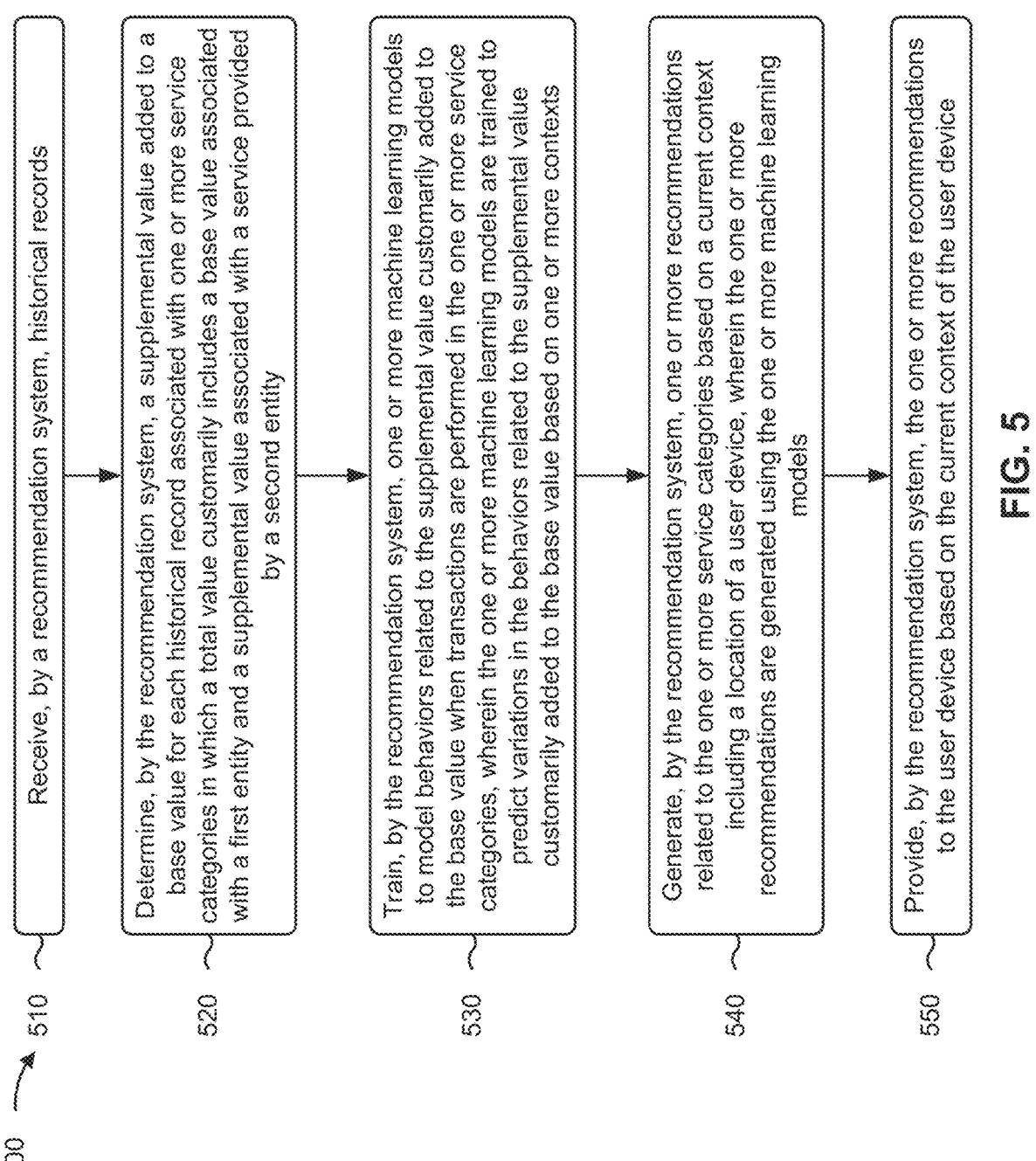

500

510 Receive, by a recommendation system, historical records

520 Determine, by the recommendation system, a supplemental value added to a base value for each historical record associated with one or more service categories in which a total value customarily includes a base value associated with a first entity and a supplemental value associated with a service provided by a second entity 530 Train, by the recommendation system, one or more machine learning models to model behaviors related to the supplemental value customarily added to the base value when transactions are performed in the one or more service categories, wherein the one or more machine learning models are trained to predict variations in the behaviors related to the supplemental value customarily added to the base value based on one or more contexts 540 Generate, by the recommendation system, one or more recommendations related to the one or more service categories based on a current context including a location of a user device, wherein the one or more recommendations are generated using the one or more machine learning models 550 Provide, by the recommendation system, the one or more recommendations to the user device based on the current context of the user device

FIG. 5

CONTEXTUAL RECOMMENDATIONS BASED ON BEHAVIORAL ANALYTICS

BACKGROUND

Informatics generally refers to a branch of information engineering that considers interactions between humans and information along with the construction of interfaces, organizations, technologies, and systems. In particular, individuals and organizations increasingly process information digitally, which has led to the study of informatics with computational, mathematical, biological, cognitive, and/or social aspects. For example, one area in which informatics are applied is in the area of behavior informatics, which refers to the informatics of behaviors so as to obtain intelligence and insights based on behavioral data derived from transactional data and/or other sources of data. Accordingly, behavior informatics may be used to build computational theories, systems, and tools to model, represent, analyze, and manage behaviors of individuals, groups, and/or organizations.

SUMMARY

Some implementations described herein relate to a system for providing contextual recommendations based on behavioral analytics. The system may include one or more memories and one or more processors communicatively coupled to the one or more memories. The one or more processors may be configured to receive historical records associated with one or more service categories in which a total value includes a base value and a supplemental value added to the base value, wherein the historical records include a first set of records that are associated with a plurality of users and received from a backend system, and a second set of records that are associated with a specific user and received from a user device associated with the specific user. The one or more processors may be configured to determine, for each historical record that is associated with the one or more service categories, the supplemental value that is added to the base value. The one or more processors may be configured to obtain one or more machine learning models that model behaviors of the plurality of users related to the supplemental value that the plurality of users customarily add to the base value when performing transactions in the one or more service categories, wherein the one or more machine learning models are trained to predict variations in the behaviors of the plurality of users based on one or more contexts. The one or more processors may be configured to generate one or more recommendations related to the one or more service categories based on a current context including a location of the user device, wherein the one or more recommendations are generated using the one or more machine learning models that model the behaviors of the plurality of users and the predicted variations in the behaviors of the plurality of users based on the one or more contexts. The one or more processors may be configured to provide, to the user device, the one or more recommendations related to the one or more service categories based on the current context of the user device.

Some implementations described herein relate to a method for providing contextual recommendations based on behavioral analytics. The method may include receiving, by a recommendation system, historical records. The method may include determining, by the recommendation system, a supplemental value added to a base value for each historical record associated with one or more service categories in which a total value customarily includes a base value associated with a first entity and a supplemental value associated with a service provided by a second entity. The method may include training, by the recommendation system, one or more machine learning models to model behaviors related to the supplemental value customarily added to the base value when transactions are performed in the one or more service categories, wherein the one or more machine learning models are trained to predict variations in the behaviors related to the supplemental value customarily added to the base value based on one or more contexts. The method may include generating, by the recommendation system, one or more recommendations related to the one or more service categories based on a current context including a location of a user device, wherein the one or more recommendations are generated using the one or more machine learning models. The method may include providing, by the recommendation system, the one or more recommendations to the user device based on the current context of the user device.

Some implementations described herein relate to a non-transitory computer-readable medium that stores a set of instructions for a system. The set of instructions, when executed by one or more processors of the system, may cause the system to receive historical records associated with one or more service categories in which a total value includes a base value and a supplemental value added to the base value, wherein the historical records include a first set of records that are associated with a plurality of users and received from a backend system, and a second set of records that are associated with a specific user and received from a user device associated with the specific user. The set of instructions, when executed by one or more processors of the system, may cause the system to determine, for each historical record that is associated with the one or more service categories, the supplemental value that is added to the base value. The set of instructions, when executed by one or more processors of the system, may cause the system to model behaviors of the plurality of users related to the supplemental value that the plurality of users customarily add to the base value when performing transactions in the one or more service categories, wherein the modeled behaviors include variations in the behaviors of the plurality of users based on one or more contexts. The set of instructions, when executed by one or more processors of the system, may cause the system to generate one or more recommendations related to the one or more service categories based on a current context including a location of the user device, wherein the one or more recommendations are generated based on the modeled behaviors of the plurality of users. The set of instructions, when executed by one or more processors of the system, may cause the system to provide, to the user device, the one or more recommendations related to the one or more service categories based on the current context of the user device.

BRIEF DESCRIPTION OF THE DRAWINGS

FIG. 5 is a flowchart of an example process associated with contextual recommendations based on behavioral analytics, in accordance with some embodiments of the present disclosure.

DETAILED DESCRIPTION

Figure 1A:
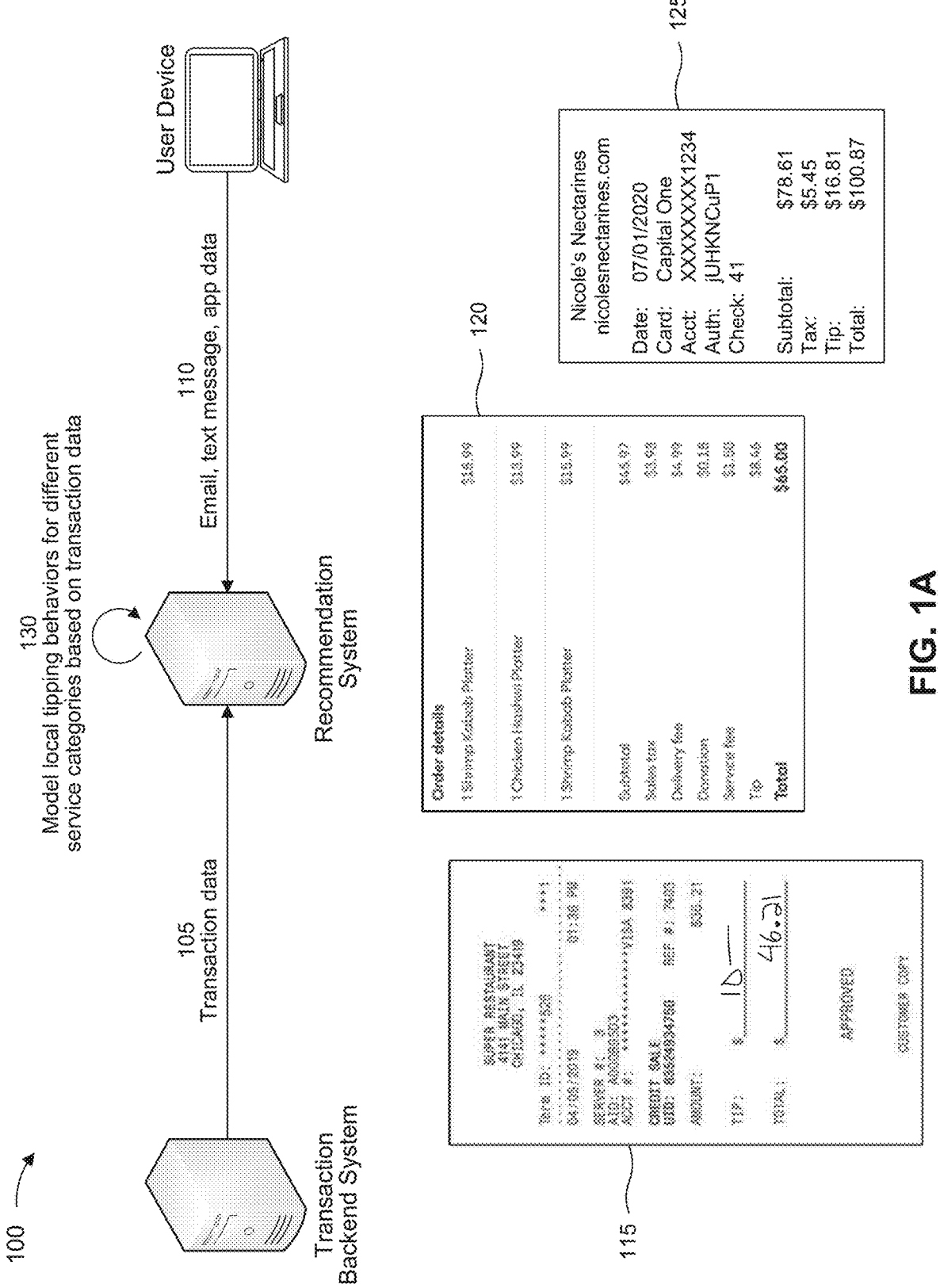
FIGS. 1A-1B are diagrams of an example associated with contextual recommendations based on behavioral analytics, in accordance with some embodiments of the present disclosure.

The following detailed description of example implementations refers to the accompanying drawings. The same reference numbers in different drawings may identify the same or similar elements.

A data analysis system may analyze information, such as content that is available on a website. For example, the data analysis system may extract the content from the website and may perform one or more machine learning techniques (e.g., parsing and/or sentiment analysis) on the extracted content. However, the data analysis typically cannot use the one or more machine learning techniques to determine whether the extracted content is accurate, reliable, relevant and/or authentic, as described in more detail elsewhere herein.

In some cases, a user may perform a transaction where the user customarily adds a tip (also called a gratuity) to a base charge associated with the transaction. Customarily, in this context, may be something performed or accepted as normal in society in accordance with accepted standards, rules, and/or models of behavior. As such, tips and their amount (e.g., whether and/or how much to tip) may be a matter of social norm and/or etiquette, which may vary based on various circumstances and/or contexts. For example, tipping behavior may vary based on a geographic location associated with the particular service. As an example, while tipping may be a customary behavior associated with table service at a restaurant in the United States, tipping may not be a customary behavior associated with table service at a restaurant in other countries.

As another example, tipping behavior may vary based on a context, such as a road condition associated with a food delivery service. As an example, a tip amount paid to a delivery service that delivers food when there is an icy road condition may be larger relative to a tip amount paid to a delivery service that delivers food when there is a normal road condition. Because tipping behavior varies based on circumstances and/or contexts, it may be difficult for a user to determine whether to tip and/or to determine an amount to tip in various scenarios.

In some cases, a data analysis system may be used to analyze tipping information, such as tipping information available on a website. For example, the website may include a tipping guide that describes tipping behaviors and/or tipping etiquette, and the data analysis system may extract the website content (e.g., the content that describes the tipping behavior and/or the tipping etiquette). The data analysis system may use machine learning text-analysis techniques to analyze the website content to determine expected tipping behavior and/or expected tipping etiquette. In some cases, the data analysis system may use parsing, sentiment analysis, word frequency analysis, collocation analysis, keyword extraction, and/or other text-analysis techniques to analyze the website content.

However, in some cases, these text-analysis techniques cannot accurately and/or reliably determine whether the website content is accurate, reliable, relevant and/or authentic. For example, these text-analysis techniques are often unable to differentiate between human-written website content and machine-generated website content and/or are unable to accurately and/or reliably extract concepts and/or meaning associated with the website content. As another example, even if the data analysis system can differentiate between human-written website content and machine-generated website content, the online tipping guides are subjective, there is no clear data to support the tipping recommendations indicated by the tipping guides, and/or the online tipping guides do not adequately provide tipping recommendations for different contexts and/or circumstances.

In some cases, the data analysis system may have access to transaction-level data associated with transactions where tipping is customarily performed. This transaction-level data often does not include item-level data, such as specific products and/or services that were exchanged in the transaction and/or an itemized cost associated with the transaction. For example, if a user dines at a restaurant, the transaction-level data may indicate that the transaction is associated with a restaurant merchant and/or a total amount paid for the transaction while item-level data associated with the dining experience may indicate a specific dish and/or a specific drink that was ordered when performing the transaction. However, the total amount paid indicated by the transaction-level data typically includes a base charge associated with the specific dish and/or the specific drink ordered by the user that is paid to the restaurant and a tip that is paid to the server associated with the restaurant. Because the transaction-level data indicates only the total amount paid for the transaction rather than the base charge and the tip, a data analysis system analyzing the transaction-level data would be unable to determine the base charge and/or the tip that the user paid when performing the transaction.

Additionally, the transaction-level data does not provide any insight into the circumstances and/or the context of the transaction other than possibly a location and a time associated with the transaction. As such, a data analysis system analyzing the transaction data would be unable to determine whether the base charge and/or the tip was modified based on the circumstances and/or the context of the transaction.

Some implementations described herein relate to a system that may organize and/or identify accurate, reliable, relevant, and/or authentic information related to tipping behavior and/or tipping etiquette across various service categories, including circumstances that may cause a tip to be increased or decreased and/or circumstances in which a tip is included or not included. For example, a recommendation system may receive transaction data that includes information such as a service category, a location, and/or a total amount paid associated with transactions, which may be used to determine a base amount (e.g., a cost associated with a product, a good, and/or a service associated with the transaction) and a tip amount (e.g., a supplemental amount added to the base amount) in certain contexts. As an example, the recommendation system may determine a tip amount based on a difference between an original amount, such as a pending amount related to a credit card purchase before a tip is added, and a final amount, such as a final amount posted to an account after the pending amount has been reversed and replaced with the final amount after the tip has been added.

In some implementations, the recommendation system may obtain other tipping data from other data sources, such as user emails, user text messages, and/or information obtained from user applications running on a user device. In some implementations, the recommendation system may look for emails and/or text messages that have traits of being receipts and/or confirmations for transactions that include tips. For example, emails and/or text messages may include keywords, such as "tip," "subtotal," and/or "total amount," and the recommendation system may scan emails and/or the text messages based on the keywords to extract tipping data. In some implementations, the user applications may be applications that the user uses to conduct transactions that include tips, such as food delivery service applications (e.g., GrubHub and/or Door Dash) and/or a car service (e.g., Uber).

The recommendation system may use the transaction data and/or the other tipping data to model customary tipping behavior based on a geographic location, such as a geographic location that is local to a user. The recommendation system may also obtain context data from various information sources to determine contexts and/or circumstances that may cause a tip to be included, not included, or modified (e.g., increased or decreased) relative to a normal range (e.g., hazardous weather, hazardous driving conditions, and/or hazardous traffic conditions. Accordingly, the recommendation system may use the transaction data and/or the other tipping data provide accurate, reliable, relevant, and/or authentic tipping behavior and/or tipping etiquette information across various services, transactions, service categories, and/or contexts).

Figure 1B:
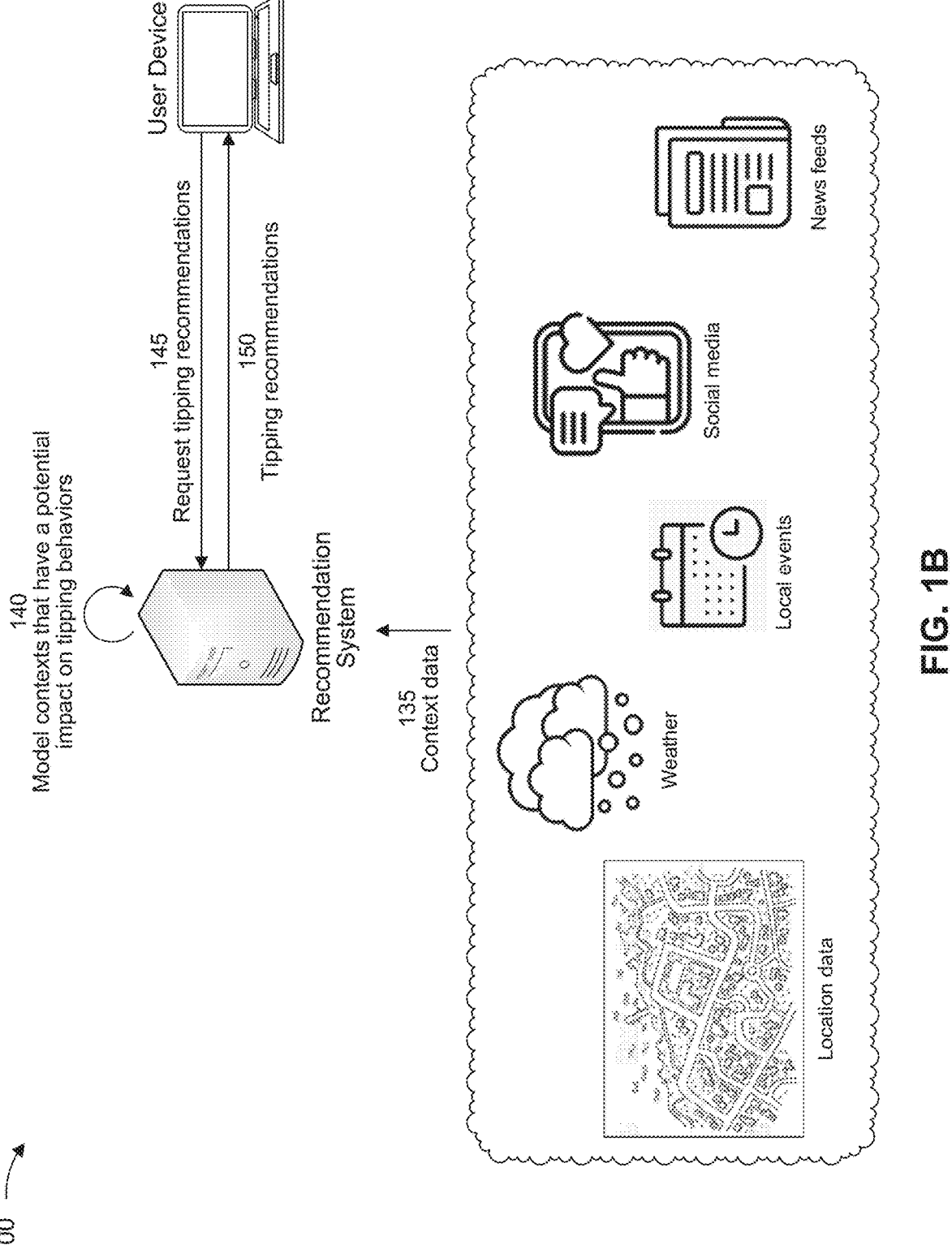

FIGS. 1A-1B are diagrams of an example 100 associated with contextual recommendations based on behavioral analytics. As shown in FIGS. 1A-1B, example 100 includes a user device, a transaction backend system, and a recommendation system. In some implementations, the transaction backend system may communicate or otherwise interact with a transaction terminal and/or a transaction device (not explicitly shown in FIGS. 1A-1B). These devices are described in more detail in connection with FIGS. 3 and 4.

As shown in FIG. 1A, and by reference number 105, the transaction backend system may provide, and the recommendation system may receive, transaction data that includes historical records associated with a plurality of users. In some implementations, the historical records may be associated with one or more service categories in which a total value (e.g., a total amount) includes a base value (e.g., a base amount) and a supplemental value (e.g., a tip) added to the base value.

For example, the one or more service categories may include a dining out service category associated with transactions in which users customarily tip wait staff at a restaurant, a food takeout service category associated with transactions in which users customarily tip takeout staff associated with a restaurant, an alcoholic beverage service category associated with transactions in which users customarily tip bar staff associated with a bar, a hotel service category associated with transactions in which users tip housekeeping, room service, porters, and/or shuttle drives associated with a hotel, a taxicab and/or rideshare service category associated with transactions in which users customarily tip drivers associated with a taxicab service and/or a rideshare service, and/or a house cleaning service category associated with transactions in which users that customarily tip house cleaners associated with a house cleaning service, among other examples.

In some implementations, the historical records may be associated with services, in the one or more categories services, where the plurality of users customarily add the supplemental value to the base value, which is included in the total value, based on the services provided to the plurality of users. As an example, a service, in a category of service, where a user may customarily add the supplemental value to the base value includes a food delivery service (e.g., a circumstance in which the user is expected to tip an entity that provides the food delivery service).

Additionally, or alternatively, the historical records may be associated with transactions in the one or more service categories where the plurality of users customarily add the supplemental value to the base value, which is included in the total value. As an example, a transaction in a service category where a user customarily adds the supplemental value to the base value may be a food delivery transaction in a food delivery service category where the user customarily pays the base amount to the entity that prepares the food and the tip to the entity that delivers the food.

Thus, in some implementations, the total value, the base value, and/or the supplemental value may be based on services associated with the one or more service categories and/or the transactions performed in the one or more service categories. Further, in some implementations, the base value may be associated with a first service provided by a first entity (e.g., a food preparation service provided by a restaurant) and the supplemental value may be associated with a second service provided by a second entity (e.g., a food delivery service provided by a driver or table service provided by restaurant waitstaff).

In this way, the recommendation system may analyze the historical records associated with the plurality of users to determine the supplemental value that is added to the base value across various services, transactions, service categories, and/or contexts, as described in more detail elsewhere herein.

In some implementations, the recommendation system may determine, for each historical record that is associated with the one or more service categories, the supplemental value that is added to the base value. For example, the recommendation system may identify, among the historical records associated with the plurality of users received from the backend system, a subset of the historical records associated with the plurality of users that are associated with an original value that is subsequently reversed and replaced with the total value. In some implementations, the recommendation system may determine that a difference between the total value and the original value is the supplemental value added to the base value.

For example, if a particular user purchases a glass of wine for $8.00 (e.g., $8.00 is the original value and/or the base value) and tips a service staff member $2.00 (e.g., $2.00 is the supplemental value and $10.00 is the total value) via a credit card, the transaction may initially appear as a pending charge of $8.00 in the user's transaction history before being reversed and replaced with a final charge of $10.00. Thus, in this example, the recommendation system may determine that that the supplemental value is $2.00 (e.g., $10.00 minus $8.00).

As another example, if a historical record is associated with an original value of $40.00, and the original value of $40.00 is subsequently reversed and replaced with a total value of $48.00, then the recommendation system may determine the supplemental value added to the base value is $8.00 (e.g., the difference between the original value and the total value).

As shown by reference number 110, the user device may provide, and the recommendation system may receive, historical records associated with a specific user. For example, the historical records may include one or more of electronic mail messages, text messages, and/or information obtained from one or more applications running on the user device that indicate the total value, the base value, and/or the supplemental value for the historical records associated with the specific user. Thus, in some implementations, the recommendation may receive a first set of historical records associated with the plurality of users and a second set of historical records associated with the specific user.

As an example, the electronic mail messages, the text messages, and/or the information obtained from the one or more applications may indicate the total value, the base value, and/or the supplemental value via content, such as information on receipts that corresponds to the historical records associated with the specific user. In some implementations, the recommendation system may receive an authorization from the user, via the user device, that authorizes the recommendation system to scan the content associated with the electronic mail messages, the text messages, and/or the information obtained from the one or more applications to determine the total value, the base value, and/or the supplemental value.

For example, the recommendation system may receive an authorization from the user device and may scan the electronic mail messages, the text messages, and/or the information obtained from the one or more applications based on keywords, phrases, numerical values, and/or other indicators related to tipping behaviors and/or tipping circumstances. In some implementations, the keywords, phrases, numerical values, or other indicators may be associated with the one or more service categories, the services provided in the one or more service categories, and/or the transactions performed in the one or more service categories, which the recommendation system may use to extract content from the historical records associated with the specific user that indicates the total value, the base value, and/or the supplemental value.

As an example, the recommendation system may scan the historical records associated with the specific user based on keywords including "amount," "gratuity," "tip," "subtotal," "service fee," "sales tax," "total" "delivery fee," "donation," "total," "tax," and/or "service charge," among other examples. Based on scanning the historical records associated with the specific user using the keywords, the recommendation system may extract the content from the historical records associated with the specific user that indicate the total value (e.g., based on the keyword "total"), the base value (e.g., based on the keyword "amount" or "subtotal"), and/or the supplemental value (e.g., based on the keyword "tip"), as described in more detail elsewhere herein. In other words, the recommendation system may scrape the historical records associated with the specific user to extract content that indicates the obtain the total value, the base value, and/or the supplemental value.

Additionally, or alternatively, the recommendation system may scan the content associated with the electronic mail messages based on senders of the electronic mail messages that are associated with the one or more service categories, the services provided in the one or more service categories, and/or the transactions performed in the one or more service categories. As an example, if a food delivery service entity named "Food Deliverer" sends an electronic mail message that includes a receipt associated with a food delivery order to the specific user, then the recommendation system may scan the electronic mail messages based on the name "Food Deliverer" to identify the electronic mail message sent by the food delivery service entity named "Food Deliverer."

Based on identifying the electronic mail message, the recommendation system may extract the content of the electronic mail message that indicates the total value, the base value, and/or the supplemental value for the historical record associated with the specific user.

As shown by reference number 115 of FIG. 1A, for example, the historical record is a receipt associated with a dining out experience in the dining out service category. As an example, if the receipt was provided to the recommendation system as content associated with an electronic mail message associated with the specific user, then the recommendation system can scan the electronic mail message to extract content from the receipt.

In this example, the recommendation system may scan the content of the receipt based on a keyword of "amount" to obtain the base value (e.g., the original amount shown as $36.21), a keyword of "tip" to obtain the supplemental value (e.g., the tip shown as $10.00), and/or a keyword of "total" to obtain the total value (e.g., the total amount shown as $46.21). Thus, in this example, the recommendation system can determine that the supplemental value that is added to the base value is $10.00 by extracting content from the receipt based on the keyword "tip." In some implementations, the recommendation system may use this information to determine a tip percentage relative to the base value based on the tip amount and the base value. For example, the recommendation system may determine that the tip percentage relative to the base value is 27.6% based on the tip amount of $10.00 and the original amount of $36.21.

Additionally, or alternatively, if the content of the receipt was stored as a pending amount related to a credit card purchase before being reversed and replaced with a final amount that includes the tip, the recommendation system may determine a tip amount based on a difference between the original amount and the final amount. For example, the recommendation system may determine that the supplemental value that is added to the base value is $10.00 based on a difference between the original amount of $36.21 and the final amount of $46.21.

As shown by reference number 120 of FIG. 1A, as another example, the historical record is a receipt associated with a food takeout service in the food takeout service category. As an example, if the receipt was provided to the recommendation system as content associated with an email or text message associated with the specific user, then the recommendation system can scan the text message to extract tipping information from the receipt. In this example, the recommendation system may scan the content of the receipt based on a keyword of "Subtotal" to obtain the base value (e.g., the original amount shown as $45.97), a keyword of "tip" to obtain the supplemental value (e.g., the tip shown as $8.46), and/or a keyword of "total" to obtain the total value (e.g., the total amount shown as $65.00) for the associated historical record. Thus, in this example, the recommendation system can determine that the supplemental value that is added to the base value is $8.46 by extracting content from the receipt. Furthermore, in some implementations, the recommendation system can use the content extracted from the receipt to determine a percentage associated with the supplemental value (e.g., relative to the subtotal, the subtotal plus sales tax, or the like), which may be associated with the corresponding service category and/or other relevant circumstances.

As shown by reference number 125 of FIG. 1A, as another example, the historical record is a receipt associated with a nectarine retail service in a nectarine retail service category. For example, if the receipt was provided to the recommendation system as content obtained from the one or more applications running on the device of the specific user, then the recommendation system can scan the information obtained from the one or more applications to extract information associated with the receipt.

In this example, the recommendation system scans the content of the receipt based on a keyword of "Subtotal" to obtain the base value (e.g., the original amount shown as $78.61), a keyword of "Tip" to obtain the supplemental value (e.g., the tip shown as $16.81), and/or a keyword of "total" to obtain the total value (e.g., the total amount shown as $100.87) for the historical record associated with the user. Thus, in this example, the recommendation system can determine that the supplemental value that is added to the base value is $16.81 by extracting content from the receipt based on the keyword "tip."

In some implementations, the recommendation system may scan the content of the receipt based on a keyword of "Date" to obtain the date for the historical record associated with the user to determine whether the date impacted the supplemental value that is added to the base value. As an example, a price associated with the nectarines may be higher if the nectarines are in season rather than out of season, which may increase a tip amount associated with purchasing nectarines when the nectarines are in season.

As shown in FIG. 1A, and by reference number 130, the recommendation system may model local tipping behaviors for different service categories based on the transaction data. For example, the recommendation system may obtain one or more machine learning models that model behaviors of the plurality of users related to the supplemental value that the plurality of users customarily add to the base value when performing transactions in the one or more service categories, as described in more detail elsewhere herein.

As shown in FIG. 1B, and by reference number 135, the recommendation system may obtain context data from one or more information sources. In some implementations, the one or more information sources may include news feeds, news alerts, weather reports, weather alerts, traffic reports, traffic alerts, social media entities, social media websites, social media feeds, social media applications, local news, regional news, national news, traffic patterns, event news, and/or user inputs, among other examples.

In some implementations, the context data obtained from the one or more information sources may be used to identify circumstances where tip amounts may vary from customary tip amounts (e.g., the tip amounts may be larger or smaller than the customary tip amounts), as described in more detail elsewhere herein. As an example, circumstances where tip amounts may be larger than customary tip amounts may include hazardous road conditions, hazardous weather conditions, and/or hazardous traffic conditions. As another example, circumstances where tip amounts may be smaller than customary tip amounts may include poor service, inaccurate delivery times, delivery of incorrect items, and/or delivering incomplete orders, among other examples. In some implementations, the context data may indicate one or more dynamic contexts and/or one or more static contexts that are associated with circumstances in which the supplemental value added to the base value may vary. For example, the one or more dynamic contexts may include hazardous weather conditions, temporary traffic detours, parades, marathon races, sporting events, excessive noise, irregular temperatures, and/or dirty conditions. As another example, the one or more static contexts may include graveled roads, difficult stair climbs, remote locations, poor views, and/or uncomfortable seating arrangements.

As shown by reference number 140, the recommendation system may model contexts that have a potential impact on tipping behaviors. In some implementations, the recommendation system may train the one or more machine learning models to predict variations in the behaviors of the plurality of users based on one or more contexts, as described in more detail elsewhere herein. For example, a particular user may pay a larger tip to a food delivery service entity that delivers food during hazardous weather conditions than a tip that the user pays to a food delivery service entity that delivers food during normal weather conditions.

In some implementations, the recommendation system may determine, using the one or more machine learning models, a normal pattern related to the supplemental value that is customarily added to the base value when performing transactions in the one or more service categories. In some implementations, the recommendation system may obtain, from the information sources, information related to the one or more contexts associated with the variations in the behaviors related to the supplemental value customarily added to the base value based on the one or more contexts. As an example, the one or more contexts may include one or more circumstances in which the supplemental value added to the base value deviates from the normal pattern, as described in more detail elsewhere herein. For example, the normal pattern may be associated with a specific location or region and/or a specific time of year to cover seasonal and/or geographic variations in tipping behavior.

As shown by reference number 145, the recommendation system may receive, from the user device, a request for the one or more recommendations. In some implementations, the user device may receive an input, from the specific user, that indicates the request for the one or more recommendations and the user device may provide the input that indicates the request for the one or more recommendations to the recommendation system. In some implementations, the request for the one or more recommendations may be associated with determining whether it is customary to tip in various contexts and/or determining a tip amount or tip percentage in various contexts.

For example, the request for the one or more recommendations may indicate the current context associated with the user device, a location of the user device, one or more service categories, one or more services associated with the one or more service categories, and/or one or more transactions associated with the one or more service categories.

In some implementations, the request for the one or more recommendations may indicate the current context associated with the specific user of the user device, and the current context may include one or more of the static circumstances and/or one or more of the dynamic circumstances that may potentially impact the supplemental value to be added to the base value in a future transaction to be conducted by the specific user.

In some implementations, the recommendation system may determine the current context based on information sources, such as weather reports and/or traffic reports. For example, the request for the one or more recommendations may indicate a desire to know whether and/or how much to tip a driver, and the recommendation system may determine that the current context is a snowing weather condition and adjust the recommended tip based on the current context.

As shown by reference number 150, the recommendation system may provide, and the user device may receive, tipping recommendations. In some implementations, the recommendation system may generate one or more recommendations related to the one or more service categories based on a current context, such as a location of the user device, weather conditions, and/or traffic conditions. In some implementations, the location of the user device may include varying levels of granularity. For example, the location may be a geographical position, a neighborhood, a city, a zip code, a region, and/or a country, among other examples.

In some implementations, the recommendation system may generate the one or more recommendations using the one or more machine learning models that model the behaviors of the plurality of users and/or the predicted variations in the behaviors of the plurality of users based on one or more contexts, as described in more detail elsewhere herein.

In some implementations, the one or more recommendations may indicate information based on the request (e.g., the information indicated in the request). For example, the one or more recommendations may be based on whether the request includes information associated with at least one of the one or more service categories in which the total value includes a supplemental value, a percentage of people who customarily tip for relative to given service, a tip amount for the given service, and/or tip amount ranges (e.g., a low tip amount range, a normal tip amount range, and/or a high tip amount range in the one or more service categories), and/or a behavioral profile associated with the specific user relative to the behaviors of the plurality of users that are modeled in the one or more machine learning models. Thus, in some implementations, the one or more recommendations may indicate a low range, a normal range, and/or a high range for an amount of the supplemental value in the one or more service categories and/or whether the amount of the supplemental value is in the low range, the normal range, or the high range for a user of the user device.

In this way, the recommendation system may generate a local tipping guide (e.g., based on the location of the user device) that indicates information associated with customary tipping behavior and/or customary tipping etiquette across various services, transactions, service categories, and/or contexts. The recommendation system may also enable a comparison between the specific user's personal tipping habits relative to the other users (e.g., whether a behavioral profile associated with the specific user is that of a low tipper, an average tipper, or a high tipper across various services, transactions, service categories, and/or contexts).

As an example, if the specific user desires to know whether it is customary to tip a barber for a barber service that is a standard haircut, then user device may receive, from the specific user, the request for the one or more recommendations that indicates that the current context is a barber service for a standard haircut, that the location of the user device is Cleveland, Ohio, and that the service category is a barber service category. The recommendation system may generate the one or more recommendations based on historical records associated with barber services, such as standard haircuts, in Cleveland, Ohio. As an example, the recommendation system may generate the one or more recommendations based on transaction data, electronic mail messages, text messages, and/or information obtained from one or more applications running on the user device associated with barber services (e.g., standard haircuts) in Cleveland, Ohio.

In this example, the one or more recommendations, generated by the recommendation system, may indicate information such as an average cost for a standard haircut in Cleveland, Ohio (e.g., $50.00), a percentage of people who customarily tip for a standard haircut in Cleveland, Ohio (e.g. 80%), a customary tip amount for a standard haircut in Cleveland, Ohio (e.g., $10.00 or 20% of the average cost), and/or a range of tip amounts for the standard haircut in Cleveland, Ohio, such as a low tip amount (e.g., $2.50 or 5% of the average cost), an average tip amount (e.g., $5.00 or 20% of the average cost), and/or a high tip amount (e.g., $15.00 or 30% of the average cost).

As another example, if the specific user knows that it is customary to tip a barber for barber services, but does not know a customary tip amount for an upgraded barber service that includes a haircut and a beard shave, then user device may receive, from the specific user, the request for the one or more recommendations that indicates that the current context is a barber service that is an upgraded service of a haircut and a beard shave, that the location of the user device is Cleveland, Ohio, and that the service category is a barber service category.

In this example, the one or more recommendations, generated by the recommendation system, may indicate information such as an average cost for a haircut and a beard shave in Cleveland, Ohio (e.g., $75.00), a percentage of people who customarily tip for an upgraded haircut in Cleveland, Ohio (e.g. 95%), a tip amount for an upgraded haircut in Cleveland, Ohio (e.g., $15.00), and/or a range of tip amounts for the upgraded haircut in Cleveland, Ohio, such as a low tip amount (e.g., $3.75 or 5% of the average cost), an average tip amount (e.g., $15.00 or 20% of the average cost), and/or a high tip amount (e.g., $22.50 or 30% of the average cost).

In some implementations, the request may be based on a future transaction associated with the specific user. As an example, the request may indicate that the current context associated with the specific user of the user device is a hazardous weather condition where the hazardous weather condition may potentially impact the supplemental value to be added to the base value in a future transaction. In this example, the one or more recommendations generated by the recommendation system may include an indication of the supplemental value to be added to the base value in the future transaction. In this way, the one or more recommendations may enable a determination as to whether it is appropriate to tip and/or a determination of a tip amount for future transactions in various contexts (e.g., the current contexts).

In some implementations, the recommendation system may determine an initial supplemental value that is added to the base value associated with a transaction at a first time and a subsequent supplemental value that is added to the base value associated with the transaction at a subsequent time. For example, a food delivery service application may allow a user to change a tip amount within a time period associated with a transaction, such as within twenty-four hours of the transaction.

Thus, in some implementations, the recommendation system may perform a first scan of information (e.g., of information associated with a food service delivery application) at a first time, such as an initial time of the transaction, to obtain the initial supplemental value, and may perform a second scan of information (e.g., of information associated with the food service delivery application at a second time), such as within twenty four hours, to determine whether the initial supplemental value has been changed to the subsequent supplemental value. Additionally, the recommendation system may determine a circumstance that caused the initial supplemental value to be changed to the subsequent supplemental value.

As an example, the user may use a food ordering application to order takeout from a restaurant, may pick up the food and provide an initial supplemental value (e.g., $10.00), may change the initial supplemental value to a subsequent supplemental value (e.g., $5.00) when the user finds a bug in the food, and may describe the circumstance that caused the user to change the initial supplemental value to the subsequent supplemental value to others (e.g., via a social media post).

In this example, the recommendation system perform a first scan of the information associated with the food ordering application at a first time (e.g., shortly after the user places the order) to obtain the initial supplemental value (e.g., $10.00), and may perform a second scan of the information associated with the food ordering application at a second time (e.g., within twenty-four hours from when the user places the order) to obtain the subsequent supplemental value (e.g., $5.00). Further, the recommendation system may scan the information associated with the user's social media post to determine the circumstance that caused the user to change the initial supplemental value to the subsequent supplemental value (e.g., finding a bug in the food).

Accordingly, the recommendation system may provide accurate, reliable, relevant, and/or authentic tipping behavior and/or tipping etiquette information across various services, transactions, service categories, and/or contexts).

As indicated above, FIGS. 1A-1B are provided as an example. Other examples may differ from what is described with regard to FIGS. 1A-1B.

Figure 2:
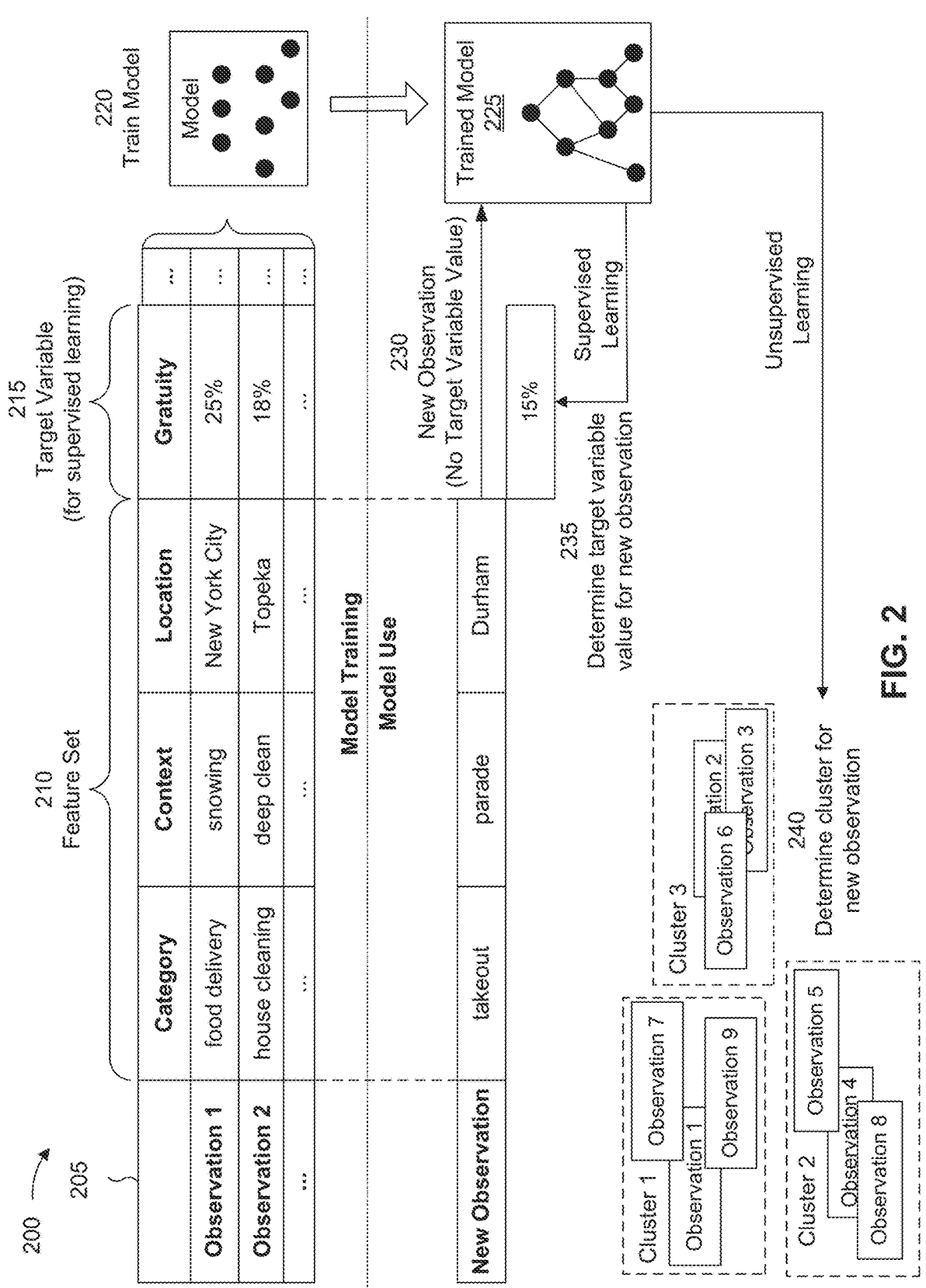
FIG. 2 is a diagram illustrating an example of training and using a machine learning model in connection with contextual recommendations based on behavioral analytics, in accordance with some embodiments of the present disclosure.

FIG. 2 is a diagram illustrating an example 200 of training and using a machine learning model in connection with contextual recommendations based on behavioral analytics. The machine learning model training and usage described herein may be performed using a machine learning system. The machine learning system may include or may be included in a computing device, a server, a cloud computing environment, or the like, such as the recommendation system described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the recommendation system, the transaction backend system, and/or the user device, as described elsewhere herein.

As shown by reference number 210, the set of observations may include a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the recommendation system, the transaction backend system, and/or the user device. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of category, a second feature of context, a third feature of location, and so on. As shown, for a first observation, the first feature may have a value of food delivery, the second feature may have a value of snowing, the third feature may have a value of New York City, and so on. These features and feature values are provided as examples, and may differ in other examples. For example, the feature set may include one or more of the following features: irregular temperature, high temperature, low temperature, high winds, precipitation, rain, sleet, hail, normal road condition, cautionary driving conditions, hazardous driving conditions, dangerous driving conditions, unplowed roads, hard-packed snow, heavy precipitation, limited visibility, icy road condition, hazardous road condition, lane closed, road closed, roadwork, steep grade, tight bend, water over roadway, changed traffic conditions, loose surface, potholes, rough, slippery surface, formed roadway, graveled roadway, sealed roadway, unformed roadway, unsealed roadway, work zone, hazardous weather condition, detour route, parade traffic, event traffic, sporting event traffic, downtown traffic, traffic jam, thunderstorm, heat wave, windy, long route, unacceptable quality of service, acceptable quality of service, excellent quality of service, easy access, difficult access, long walkup, difficult stair climb, dirty areas, pristine areas, contaminated surfaces, dusty, moldy, inadequate time, extended time, residue, wet floors, dirty floors, and/or non-obligatory cleaning, among other examples. In some implementations, the features associated with an observation may vary from one service category to another service category.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is gratuity, which has a value of 25% for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As an example, the machine learning system may obtain training data for the set of observations based on historical records associated with the plurality of users obtained from the transaction backend system and/or the historical records associated with the specific user, as described in more detail above.

As shown by reference number 230, the machine learning system may apply the trained machine learning model 225 to a new observation, such as by receiving a new observation and inputting the new observation to the trained machine learning model 225. As shown, the new observation may include a first feature of takeout, a second feature of parade, a third feature of Durham, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of 15% for the target variable of gratuity for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, recommending that a supplemental value of 15% should be added to the base value (e.g., a tip of 15% of the base value). The first automated action may include, for example, automatically authorizing a tip amount on the user's behalf, such as when the user authorizes the recommendation system to enter into a transaction on the user's behalf.

As another example, if the machine learning system were to predict a value of 25% for the target variable of gratuity, then the machine learning system may provide a second (e.g., different) recommendation (e.g., add a supplemental value to the base value).

In some implementations, the trained machine learning model 225 may classify (e.g., cluster) the new observation in a cluster, as shown by reference number 240. The observations within a cluster may have a threshold degree of similarity. For example, if the historical records indicate that the plurality of users always tip in a food delivery category, then the new observation that includes the feature of food delivery may be classified in the first cluster. As an example, if the machine learning system classifies the new observation in a first cluster (e.g., always tip), then the machine learning system may provide a first recommendation, such as the first recommendation described above.

As another example, if the machine learning system were to classify the new observation in a second cluster (e.g., sometimes tip), then the machine learning system may provide a second (e.g., different) recommendation (e.g., recommending that a tip may be provided, if desired).

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 225 may be re-trained using feedback information. For example, feedback may be provided to the machine learning model. The feedback may be associated with actions performed based on the recommendations provided by the trained machine learning model 225 and/or automated actions performed, or caused, by the trained machine learning model 225. In other words, the recommendations and/or actions output by the trained machine learning model 225 may be used as inputs to re-train the machine learning model (e.g., a feedback loop may be used to train and/or update the machine learning model). For example, the feedback information may include a gratuity percentage based on a particular category, a particular context, and/or a particular location that is an output from the model.

In this way, the machine learning system may apply a rigorous and automated process to model behaviors of the plurality of users related to the supplemental value that the plurality of users customarily add to the base value when performing transactions in the one or more service categories, including predicting variations in the behaviors of the plurality of users based on one or more contexts, as described in more detail elsewhere herein. The machine learning system may enable recognition and/or identification of tens, hundreds, thousands, or millions of features and/or feature values for tens, hundreds, thousands, or millions of observations, thereby increasing accuracy and consistency and reducing delay associated with model behaviors of the plurality of users related to the supplemental value that the plurality of users customarily add to the base value when performing transactions in the one or more service categories, including predicting variations in the behaviors of the plurality of users based on one or more contexts relative to requiring computing resources to be allocated for tens, hundreds, or thousands of operators to manually model behaviors of the plurality of users related to the supplemental value that the plurality of users customarily add to the base value when performing transactions in the one or more service categories, including predicting variations in the behaviors of the plurality of users based on one or more contexts using the features or feature values.

As indicated above, FIG. 2 is provided as an example. Other examples may differ from what is described in connection with FIG. 2.

Figure 3:
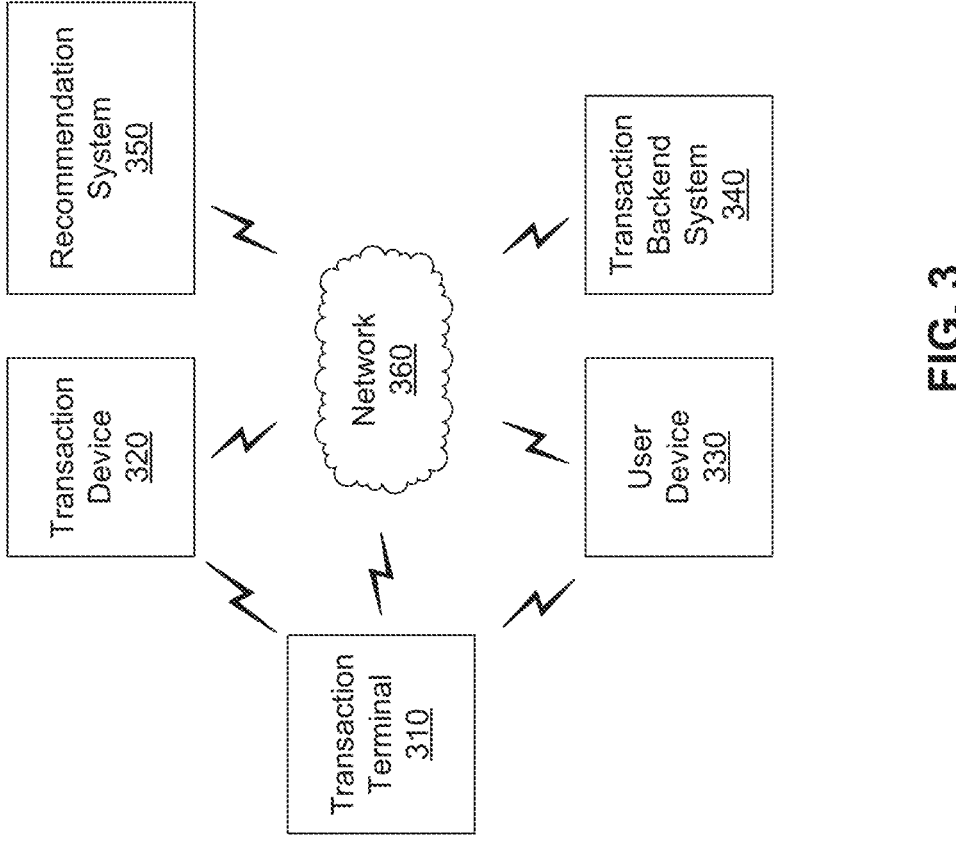
FIG. 3 is a diagram of an example environment in which systems and/or methods described herein may be implemented, in accordance with some embodiments of the present disclosure.

FIG. 3 is a diagram of an example environment 300 in which systems and/or methods described herein may be implemented. As shown in FIG. 3, environment 300 may include a transaction terminal 310, a transaction device 320, a user device 330, a transaction backend system 340, a recommendation system 350, and/or a network 360. Devices of environment 300 may interconnect via wired connections, wireless connections, or a combination of wired and wireless connections.

The transaction terminal 310 may include one or more devices capable of facilitating an electronic transaction. For example, the transaction terminal 310 may include a point-of-sale (PoS) terminal, a payment terminal (e.g., a credit card terminal, a contactless payment terminal, a mobile credit card reader, or a chip reader), and/or an automated teller machine (ATM). The transaction terminal 310 may include one or more input components and/or one or more output components to facilitate obtaining data (e.g., account information) from a transaction device (e.g., a transaction card, a mobile device executing a payment application, or the like) and/or to facilitate interaction with and/or authorization from an owner or accountholder of the transaction device. Example input components of the transaction terminal 310 include a number keypad, a touchscreen, a magnetic stripe reader, a chip reader, and/or a radio frequency (RF) signal reader (e.g., a near-field communication (NFC) reader). Example output devices of transaction terminal 310 include a display and/or a speaker.

The transaction device 320 may include one or more devices capable of being used for an electronic transaction. In some implementations, the transaction device 320 may include a transaction card (or another physical medium with integrated circuitry) capable of storing and communicating account information, such as a credit card, a debit card, a gift card, an ATM card, a transit card, a fare card, and/or an access card. In some implementations, the transaction device 320 may be a mobile device or may be integrated into the mobile device. For example, the mobile device may execute an electronic payment application capable of performing functions of the transaction device 320 described herein. Thus, one or more operations described herein as being performed by the transaction device 320 may be performed by a transaction card, the mobile device, or a combination thereof.

The transaction device 320 may store account information associated with the transaction device 320, which may be used in connection with an electronic transaction. The account information may include, for example, an account identifier that identifies an account (e.g., a bank account or a credit account) associated with the transaction device 320 (e.g., an account number, a card number, a bank routing number, and/or a bank identifier), a cardholder identifier (e.g., identifying a name of a person, business, or entity associated with the account or the transaction device 320), expiration information (e.g., identifying an expiration month and/or an expiration year associated with the transaction device 320), and/or a credential (e.g., a payment token). In some implementations, the transaction device 320 may store the account information in tamper-resistant memory of the transaction device 320, such as in a secure element. As part of performing an electronic transaction, the transaction device 320 may transmit the account information to a transaction terminal using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a Bluetooth Low Energy (BLE) component). Thus, the transaction device 320 and the transaction terminal may communicate with one another by coming into contact with one another (e.g., using a magnetic stripe or an EMV chip) or via contactless communication (e.g., using NFC).

The user device 330 may include one or more devices capable of receiving, generating, storing, processing, and/or providing information associated with contextual recommendations based on behavioral analytics, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The transaction backend system 340 may include one or more devices capable of processing, authorizing, and/or facilitating a transaction. For example, the transaction backend system 340 may include one or more servers and/or computing hardware (e.g., in a cloud computing environment or separate from a cloud computing environment) configured to receive and/or store information associated with processing an electronic transaction. The transaction backend system 340 may process a transaction, such as to approve (e.g., permit, authorize, or the like) or decline (e.g., reject, deny, or the like) the transaction and/or to complete the transaction if the transaction is approved. The transaction backend system 340 may process the transaction based on information received from a transaction terminal, such as transaction data (e.g., information that identifies a transaction amount, a merchant, a time of a transaction, a location of the transaction, or the like), account information communicated to the transaction terminal by a transaction device (e.g., a transaction card, a mobile device executing a payment application, or the like) and/or information stored by the transaction backend system 340 (e.g., for fraud detection).

The transaction backend system 340 may be associated with a financial institution (e.g., a bank, a lender, a credit card company, or a credit union) and/or may be associated with a transaction card association that authorizes a transaction and/or facilitates a transfer of funds. For example, the transaction backend system 340 may be associated with an issuing bank associated with the transaction device, an acquiring bank (or merchant bank) associated with the merchant and/or the transaction terminal, and/or a transaction card association (e.g., VISA® or MASTERCARD®) associated with the transaction device. Based on receiving information associated with the transaction device from the transaction terminal, one or more devices of the transaction backend system 340 may communicate to authorize a transaction and/or to transfer funds from an account associated with the transaction device to an account of an entity (e.g., a merchant) associated with the transaction terminal.

The recommendation system 350 may include one or more devices capable of receiving, generating, storing, processing, providing, and/or routing information associated with contextual recommendations based on behavioral analytics, as described elsewhere herein. The recommendation system 350 may include a communication device and/or a computing device. For example, the recommendation system 350 may include a server, such as an application server, a client server, a web server, a database server, a host server, a proxy server, a virtual server (e.g., executing on computing hardware), or a server in a cloud computing system. In some implementations, the recommendation system 350 may include computing hardware used in a cloud computing environment.

The network 360 may include one or more wired and/or wireless networks. For example, the network 360 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 360 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
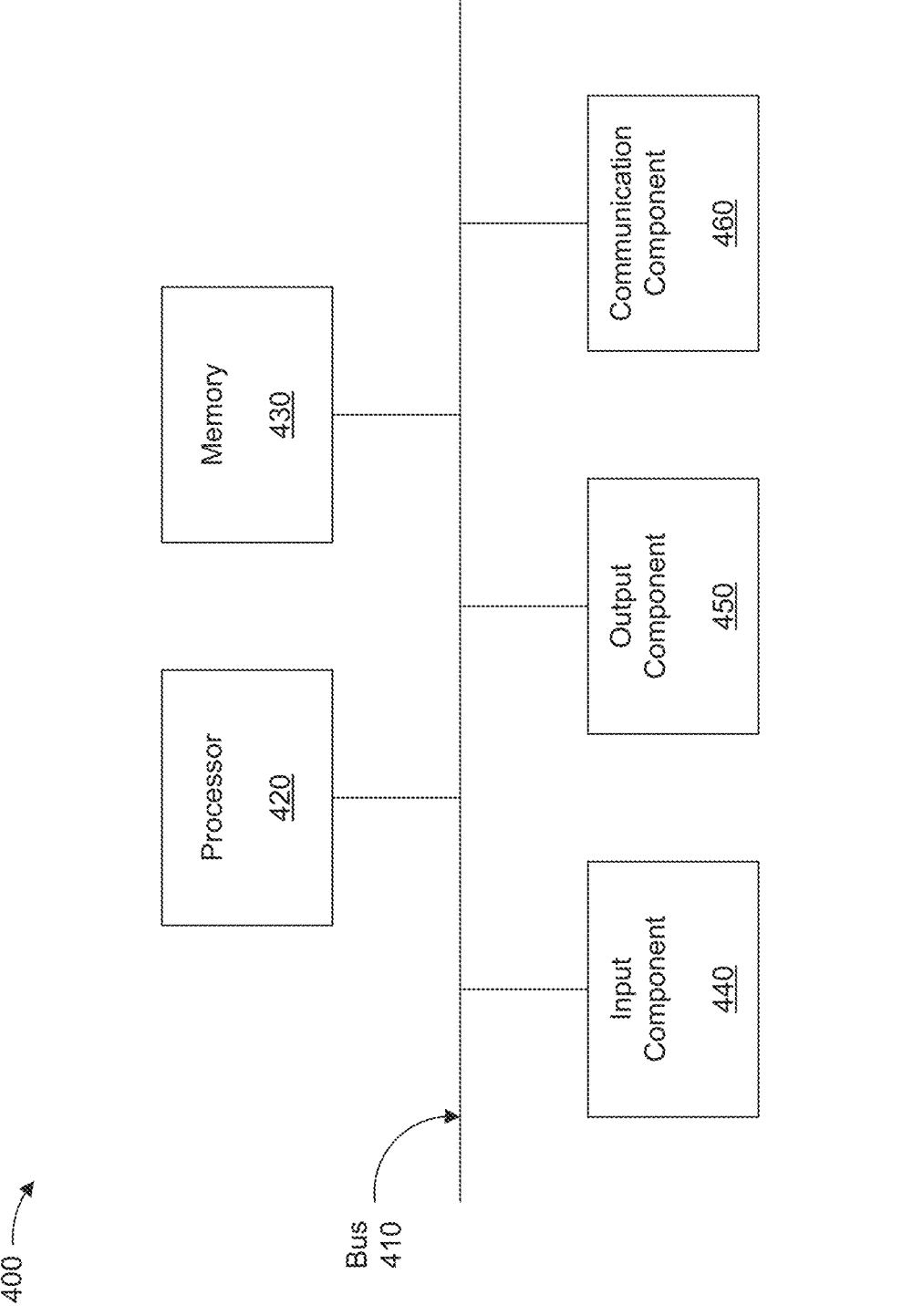
FIG. 4 is a diagram of example components of a device associated with contextual recommendations based on behavioral analytics, in accordance with some embodiments of the present disclosure.

FIG. 4 is a diagram of example components of a device 400 associated with contextual recommendations based on behavioral analytics. The device 400 may correspond to the transaction terminal 310, the transaction device 320, the user device 330, the transaction backend system 340, and/or the recommendation system 350. In some implementations, the transaction terminal 310, the transaction device 320, the user device 330, the transaction backend system 340, and/or the recommendation system 350 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with contextual recommendations based on behavioral analytics. In some implementations, one or more process blocks of FIG. 5 may be performed by the recommendation system 350. In some implementations, one or more process blocks of FIG. 5 may be performed by another device or a group of devices separate from or including the recommendation system 350, such as the transaction terminal 310, the transaction device 320, the user device 330, and/or the transaction backend system 340. Additionally, or alternatively, one or more process blocks of FIG. 5 may be performed by one or more components of the device 400, such as processor 420, memory 430, input component 440, output component 450, and/or communication component 460.

As shown in FIG. 5, process 500 may include receiving historical records (block 510). For example, the recommendation system 350 (e.g., using processor 420, memory 430, input component 440, and/or communication component 460) may receive historical records, as described above in connection with reference number 105 of FIG. 1A. As an example, the transaction backend system may provide, and the recommendation may receive, historical records associated with a plurality of users that customarily add a tip to a base value associated with a transactions in one or more service categories.

As further shown in FIG. 5, process 500 may include determining a supplemental value added to a base value for each historical record associated with one or more service categories in which a total value customarily includes a base value associated with a first entity and a supplemental value associated with a service provided by a second entity (block 520). For example, the recommendation system 350 (e.g., using processor 420 and/or memory 430) may determine a supplemental value added to a base value for each historical record associated with one or more service categories in which a total value customarily includes a base value associated with a first entity and a supplemental value associated with a service provided by a second entity, as described above in connection with FIG. 1A. As an example, the recommendation system may determine the supplemental value that is added to the base value based on a difference between an original amount and a final amount associated with a transaction and/or based on content obtained from one or more electronic mail messages, text messages, and/or application data, among other examples.

As further shown in FIG. 5, process 500 may include training one or more machine learning models to model behaviors related to the supplemental value customarily added to the base value when transactions are performed in the one or more service categories, wherein the one or more machine learning models are trained to predict variations in the behaviors related to the supplemental value customarily added to the base value based on one or more contexts (block 530). For example, the recommendation system 350 (e.g., using processor 420 and/or memory 430) may train one or more machine learning models to model behaviors related to the supplemental value customarily added to the base value when transactions are performed in the one or more service categories, wherein the one or more machine learning models are trained to predict variations in the behaviors related to the supplemental value customarily added to the base value based on one or more contexts, as described above in connection with reference number 130 of FIG. 1A. As an example, the recommendation system may use the historical records associated with the plurality of users to train the one or more machine models and model the tipping behaviors associated with the plurality of users.

In some implementations, the one or more machine learning models are trained to predict variations in the behaviors related to the supplemental value customarily added to the base value based on one or more contexts, as described in more detail elsewhere herein.

As further shown in FIG. 5, process 500 may include generating one or more recommendations related to the one or more service categories based on a current context including a location of a user device, wherein the one or more recommendations are generated using the one or more machine learning models (block 540). For example, the recommendation system 350 (e.g., using processor 420 and/or memory 430) may generate one or more recommendations related to the one or more service categories based on a current context including a location of a user device, wherein the one or more recommendations are generated using the one or more machine learning models, as described above in connection with FIG. 1B As an example, the recommendation system may generate one or more recommendations, such as whether it is customary to tip and/or a tip amount based on contexts.

In some implementations, the one or more recommendations are generated using the one or more machine learning models.

As further shown in FIG. 5, process 500 may include providing the one or more recommendations to the user device based on the current context of the user device (block 550). For example, the recommendation system 350 (e.g., using processor 420 and/or memory 430) may provide the one or more recommendations to the user device based on the current context of the user device, as described above in connection with reference number 150 of FIG. 1B. As an example, the recommendation system may provide, and the user device may receive, the one or more recommendations, which may be displayed or otherwise presented via the user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel. The process 500 is an example of one process that may be performed by one or more devices described herein. These one or more devices may perform one or more other processes based on operations described herein, such as the operations described in connection with FIGS. 1A-1B. Moreover, while the process 500 has been described in relation to the devices and components of the preceding figures, the process 500 can be performed using alternative, additional, or fewer devices and/or components. Thus, the process 500 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for providing contextual recommendations based on behavioral analytics, the system comprising:
one or more memories; and
one or more processors, communicatively coupled to the one or more memories, configured to:
receive historical records associated with one or more service categories in which a total value includes a base value and a supplemental value added to the base value, wherein the historical records include:
a first set of records that are associated with a plurality of users and received from a backend system, and
a second set of records that are associated with a specific user and received from a user device associated with the specific user;
determine, for each historical record that is associated with the one or more service categories, the supplemental value that is added to the base value;
obtain and apply one or more machine learning models that model behaviors of the plurality of users related to the supplemental value that the plurality of users customarily add to the base value when performing transactions in the one or more service categories,
wherein the one or more machine learning models are trained to predict variations in the behaviors of the plurality of users based on one or more contexts;
generate one or more recommendations related to the one or more service categories based on a current context of the user device,
wherein the current context includes one or more static circumstances and one or more dynamic circumstances,
wherein the one or more dynamic circumstances include weather conditions or traffic conditions associated with a location of the user device, and
wherein the one or more recommendations are generated using the one or more machine learning models and the predicted variations in the behaviors of the plurality of users based on the one or more contexts;
provide, to the user device, the one or more recommendations related to the one or more service categories based on the current context;

perform one or more automated actions based on the one or more recommendations, wherein the one or more automated actions includes automatically authorizing or adjusting a supplemental value for a transaction through an interface with a transaction backend system;
transmit authorization information to a transaction backend system;
automatically cause the transaction backend system to process the transaction in response to receiving the authorization information from the system; and
re-train, using a feedback loop, the one or more machine learning models based on the one or more recommendations and the one or more automated actions.

2. The system of claim 1,
wherein the one or more processors, to determine the supplemental value that is added to the base value, are configured to:
identify, among the first set of records received from the backend system, a subset of the first set of records associated with an original value that is subsequently reversed and replaced with the total value; and
determine that a difference between the total value and the original value is the supplemental value added to the base value.

3. The system of claim 1,
wherein the second set of records include one or more of electronic mail messages, text messages, or information obtained from one or more applications running on the user device that indicate the total value, the base value, and the supplemental value for the second set of records.

4. The system of claim 1,
wherein the one or more processors are further configured to:
determine, using the one or more machine learning models, a normal pattern related to the supplemental value that the plurality of users customarily add to the base value when performing transactions in the one or more service categories; and
obtain, from one or more information sources, information related to the one or more contexts associated with the predicted variations in the behaviors of the plurality of users,
wherein the one or more contexts include one or more static contexts and one or more dynamic contexts that are associated with circumstances in which the supplemental value added to the base value deviates from the normal pattern.

5. The system of claim 1,
wherein the one or more recommendations indicate whether a service category is included among the one or more service categories in which the total value includes a supplemental value and indicate one or more ranges for an amount of the supplemental value.

6. The system of claim 1,
wherein the one or more recommendations indicate a behavioral profile associated with the specific user relative to the behaviors of the plurality of users that are modeled in the one or more machine learning models.

7. The system of claim 1,
wherein the one or more processors are further configured to:
receive, from the user device, a request for the one or more recommendations, wherein the request indicates the current context of the user device, wherein the one or more static circumstances and the one or more dynamic circumstances potentially impact the supplemental value to be added to the base value in a future transaction to be conducted by the specific user, and wherein the one or more recommendations include an indication of the supplemental value to be added to the base value in the future transaction based on the one or more static circumstances and the one or more dynamic circumstances.

8. A method for providing contextual recommendations based on behavioral analytics, comprising:

receiving, by a recommendation system, historical records;

determining, by the recommendation system, a supplemental value added to a base value for each historical record associated with one or more service categories in which a total value customarily includes a base value associated with a first entity and a supplemental value associated with a service provided by a second entity;

training, by the recommendation system, one or more machine learning models to model behaviors related to the supplemental value customarily added to the base value when transactions are performed in the one or more service categories, wherein the one or more machine learning models are trained to predict variations in the behaviors related to the supplemental value customarily added to the base value based on one or more contexts;

generating, by the recommendation system, one or more recommendations related to the one or more service categories based on a current context of a user device, wherein the current context includes one or more static circumstances and one or more dynamic circumstances, wherein the one or more dynamic circumstances include weather conditions, traffic conditions, or a local event associated with a location of the user device, and wherein the one or more recommendations are generated using the one or more machine learning models;

providing, by the recommendation system, the one or more recommendations to the user device based on the current context;

performing one or more automated actions based on the one or more recommendations, wherein the one or more automated actions includes automatically authorizing or adjusting a supplemental value for a transaction through an interface with a transaction backend system;

transmitting authorization information to a transaction backend system;

processing, by the transaction backend system, in response to receiving the authorization information from the recommendation system, the transaction; and re-training, using a feedback loop, the one or more machine learning models based on the one or more recommendations and the one or more automated actions.

9. The method of claim 8, wherein determining the supplemental value that is added to the base value comprises:

identifying, among a subset of the historical records received from a backend system, one or more records associated with an original value that is subsequently reversed and replaced with the total value; and determining that a difference between the total value and the original value is the supplemental value added to the base value for the one or more records.

10. The method of claim 8, wherein the historical records include one or more of electronic mail messages, text messages, or information obtained from one or more applications that indicate the total value, the base value, and the supplemental value.

11. The method of claim 8, further comprising:

determining, using the one or more machine learning models, a normal pattern related to the supplemental value that is customarily added to the base value when performing transactions in the one or more service categories; and obtaining, from one or more information sources, information related to the one or more contexts associated with the predicted variations in the behaviors related to the supplemental value customarily added to the base value based on the one or more contexts, wherein the one or more contexts include one or more circumstances in which the supplemental value added to the base value deviates from the normal pattern.

12. The method of claim 8, wherein the one or more recommendations indicate a low range, a normal range, and a high range for an amount of the supplemental value in the one or more service categories.

13. The method of claim 12, wherein the one or more recommendations indicate whether the amount of the supplemental value is in the low range, the normal range, or the high range for a user of the user device.

14. The method of claim 8, further comprising:

receiving, from the user device, a request for the one or more recommendations, wherein the request indicates the current context of the user device, and wherein the one or more recommendations include an indication of the supplemental value to be added to the base value in a future transaction based on the current context of the user device.

15. A non-transitory computer-readable medium storing a set of instructions, the set of instructions comprising:

one or more instructions that, when executed by one or more processors of a system, cause the system to:

receive historical records associated with one or more service categories in which a total value includes a base value and a supplemental value added to the base value, wherein the historical records include:

a first set of records that are associated with a plurality of users and received from a backend system, and a second set of records that are associated with a specific user and received from a user device associated with the specific user;

determine, for each historical record that is associated with the one or more service categories, the supplemental value that is added to the base value;

model, using one or more machine learning models, behaviors of the plurality of users related to the supplemental value that the plurality of users customarily add to the base value when performing transactions in the one or more service categories, wherein the modeled behaviors include variations in the behaviors of the plurality of users based on one or more contexts;

generate one or more recommendations related to the one or more service categories based on a current context of the user device, wherein the current context includes one or more static contexts and one or more dynamic contexts, wherein the one or more dynamic contexts are associated with weather conditions, traffic conditions, or a local event associated with a location of the user device, and wherein the one or more recommendations are generated based on the modeled behaviors of the plurality of users; and provide, to the user device, the one or more recommendations related to the one or more service categories based on the current context of the user device;

perform one or more automated actions based on the one or more recommendations; and re-train, using a feedback loop, the one or more machine learning models based on the one or more recommendations and the one or more automated actions.

16. The non-transitory computer-readable medium of claim 15, wherein the one or more instructions, that cause the system to determine the supplemental value that is added to the base value, cause the system to:

identify, among the first set of records received from the backend system, a subset of the first set of records associated with an original value that is subsequently reversed and replaced with the total value; and determine that a difference between the total value and the original value is the supplemental value added to the base value.

17. The non-transitory computer-readable medium of claim 15, wherein the second set of records include one or more of electronic mail messages, text messages, or information obtained from one or more applications running on the user device that indicate the total value, the base value, and the supplemental value for the second set of records.

18. The non-transitory computer-readable medium of claim 15, wherein the one or more instructions further cause the system to:

determine a normal pattern related to the supplemental value that the plurality of users customarily add to the base value when performing transactions in the one or more service categories; and obtain, from one or more information sources, information related to the one or more contexts associated with the variations in the behaviors of the plurality of users, wherein the one or more static contexts and the one or more dynamic contexts are associated with circumstances in which the supplemental value added to the base value deviates from the normal pattern.

19. The non-transitory computer-readable medium of claim 15, wherein the one or more recommendations indicate whether a service category is included among the one or more service categories in which the total value includes a supplemental value and indicate one or more ranges for an amount of the supplemental value.

20. The non-transitory computer-readable medium of claim 15, wherein the one or more recommendations indicate a behavioral profile associated with the specific user relative to the modeled behaviors of the plurality of users.

* * * * *